R. M. CALLAWAY.
TIRE TREAD.
APPLICATION FILED OCT. 25, 1915.
1,244,026. Patented Oct. 23, 1917.
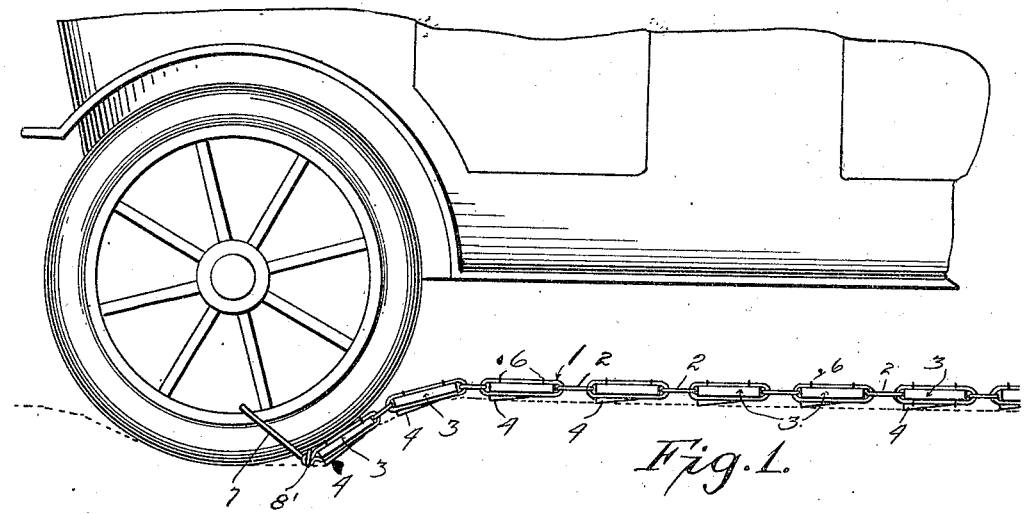
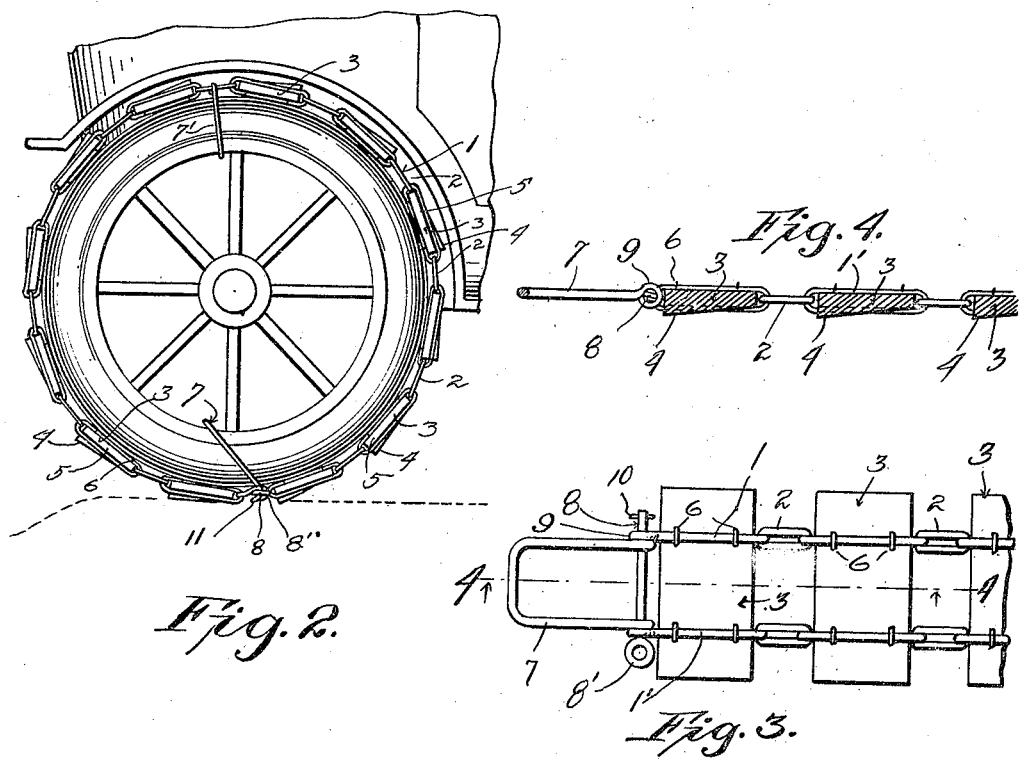

UNITED STATES PATENT OFFICE.

ROBERT M. CALLAWAY, OF MONETT, MISSOURI.

TIRE-TREAD.

1,244,026.  Specification of Letters Patent.  Patented Oct. 23, 1917.

Application filed October 25, 1915. Serial No. 57,835.

*To all whom it may concern:*

Be it known that I, ROBERT M. CALLAWAY, a citizen of the United States, residing at Monett, in the county of Barry, State of Missouri, have invented certain new and useful Improvements in Tire-Treads; and I do hereby declare the following to be a full, clear, and exact description of the invention, such as will enable others skilled in the art to which it appertains to make and use the same.

This invention relates to tire treads and particularly those of the detachable type adapted to be applied to a wheel when the vehicle is traveling through mud holes and removed at other times.

The object of the invention is to provide a device of the character named which can be easily applied to the wheel of a vehicle and which is simple in construction, efficient in use and cheap to manufacture.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a portion of an automobile showing the manner of instituting the application of the tread to a wheel;

Fig. 2, a view similar to Fig. 1 showing the tread fully applied and the wheel excavated from the mud hole by such application;

Fig. 3, an enlarged plan view of a portion of the tread, and

Fig. 4, a section on the line 4—4 of Fig. 3.

Referring to the drawings 1 denotes longitudinal parallel chain members, comprising relatively long links 1', which are connected at their ends by the shorter links 2. Tread blocks 3, are disposed transversely of the chain members, and have their central portions enlarged and beveled at 4. The said tread blocks 3 have their ends disposed in corresponding long links 1', and are secured to the said links by staples 6, so that the enlarged beveled portions of said tread plates will be arranged between the long links, and the thickened rear edge of each block will precede the thin edge of the following block, and the enlarged portion of each block will project downwardly from the links, forming gripping toes or contact surfaces.

Pivotally connected in one end of the chain device, is the yoke member 7, and a pin 8 passes through the eyes 9 of the yokes and the outer ends of the end links 1', and a cotter pin 10 passes through one end of said pin, preventing longitudinal movement of the pin and holding in position the said yoke. At the opposite end the pin 8 is formed with an eye 8'.

In operation, the yoke at one end of the chain device is secured to the rear wheel, and preferably extended forwardly in a line with the path of the wheel and upon the power being applied to the rear drive wheel, the chain member will be actuated and be wound on the rear wheel, and at the same time the drive wheel will engage the tread blocks and ride upon same, thereby clearing the mired surface of the road, or enabling the wheels to become elevated from the ruts in which they have been positioned. In the latter position, as illustrated in Fig. 2, the chain member will be wound entirely around the tread of the drive wheel and is secured thereon by a second yoke 7'. The opposite end of the chain element is provided with hooks 11, which engage the eye 8' and the pin 8, to connect the ends of the element on the tire and in this position the wheels have entirely cleared the obstructions in the road.

It is, therefore, obvious that, upon the vehicle being positioned in a rut in the road, or should the same become mired in mud or in a sandy road bed, upon the chain element being properly attached to a rear wheel, so that the same engages the tread thereof, and upon the attachment of the second yoke when the chain element is wound, the said drive wheel, when power is applied, will actuate the tread chain member and cause the rear wheel to revolve, in order to obtain a suitable contact with the road surface, and the rear wheel will have its tread engaging the tread blocks of the chain member, and will thereby under its own power be moved from engagement with the road obstruction.

From the foregoing description, taken in connection with the accompanying drawings, the advantages of the construction, and the method of operation will be readily apparent to those skilled in the art to which the invention pertains, and while I have described the operation of the invention, together with the device, which I now consider to be the embodiment thereof, I desire to have it understood that the device shown is merely illustrative, and that such changes may be made when desired, as are within the scope of the claims hereto appended.

What I claim and desire to secure by Letters Patent is:

1. A tread for tires comprising in combination, a pair of spaced parallel chains consisting of alternate long and short links, and tread blocks secured in corresponding long links, said tread blocks maintaining said chains in spaced parallel relation.

2. A tread for tires comprising in combination, a pair of spaced chains consisting of alternate long and short links, tread blocks passing through corresponding long links, and securing means for fastening the tread blocks to the chains.

3. A tread for tires comprising in combination, a pair of spaced parallel chains consisting of alternate long and short links, and tread members having their ends passing through corresponding long links and projecting therebeyond.

In testimony whereof, I affix my signature, in the presence of two witnesses.

ROBERT M. CALLAWAY.

Witnesses:
NORTHAR MOORE,
GEORGE BENNET.